UNITED STATES PATENT OFFICE.

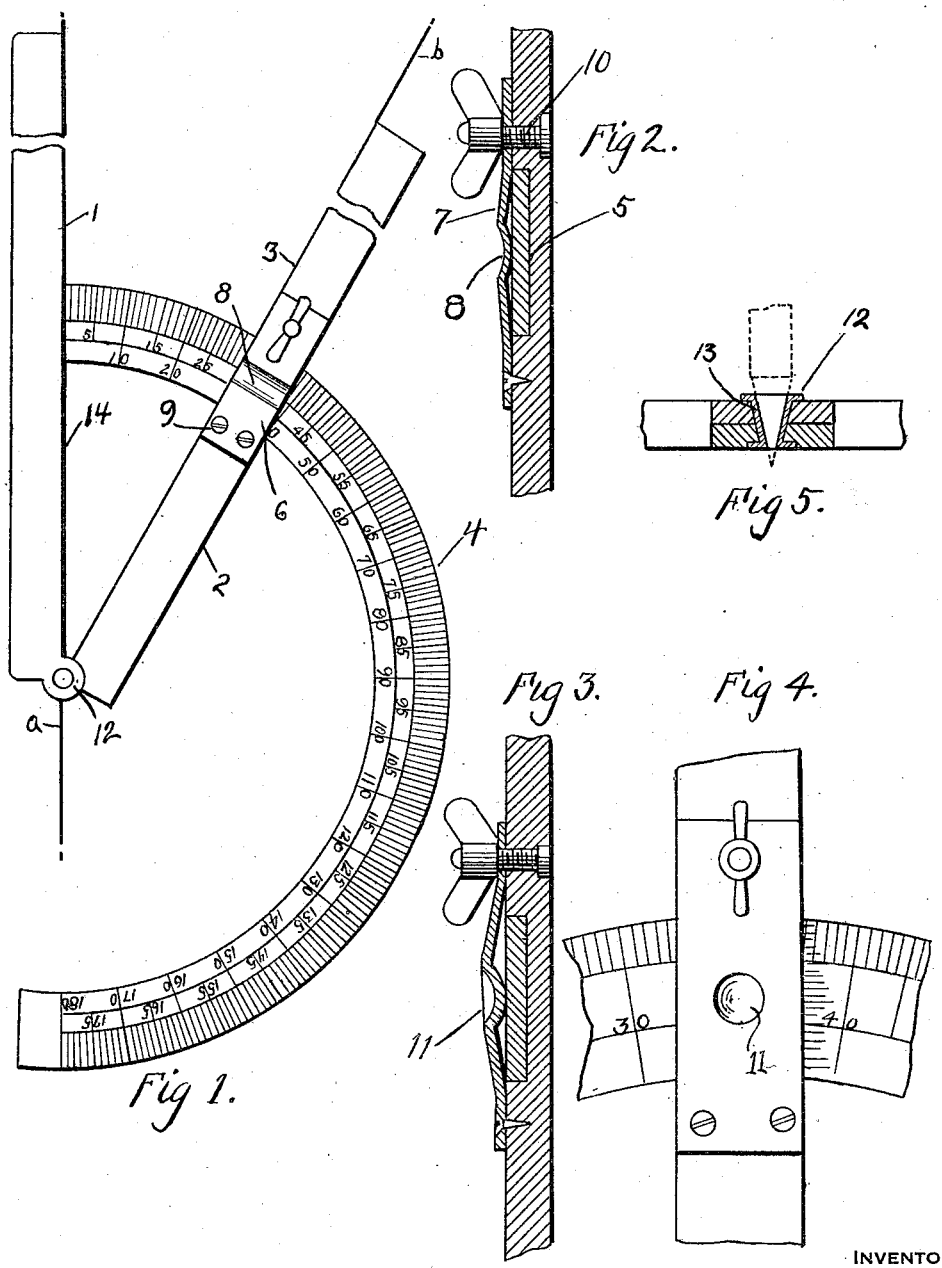

ORRANGE CIVITTS, OF PITTSBURGH, PENNSYLVANIA.

MEASURING INSTRUMENT.

1,277,860.   Specification of Letters Patent.   Patented Sept. 3, 1918.

Application filed March 10, 1917. Serial No. 153,895.

*To all whom it may concern:*

Be it known that I, ORRANGE CIVITTS, a citizen of the United States, residing at Pittsburgh, in the county of Allegheny and State of Pennsylvania, have invented new and useful Improvements in Measuring Instruments, of which the following is a specification.

This invention relates to a measuring instrument and has for its primary object to provide a measuring instrument by means of which the exact relation that one line bears to another may be readily determined.

An object of the invention is the simple manner of constructing a device to accomplish the foregoing result and the manner of rigidly holding one of the limbs in an adjusted position.

With these and other objects in view the invention will be better understood from the following detail description taken in connection with the accompanying drawing wherein:—

Figure 1 is a plan view of the instrument showing portions of the limbs broken away.

Fig. 2 is a sectional view of the clamping device.

Figs. 3 and 4 are detail views of a modified form of clamping device.

Fig. 5 is a detail sectional view of one form of pivot that may be used with my invention.

Again referring to the drawing the numeral 1 designates a stationary limb, that is to say that it is held stationary relative to the center line $a$. The numeral 2 designates the movable limb that is adapted to be moved to such a position that the straight edge 3 will coincide with the second line $b$.

The limb has secured thereto in any suitable manner or formed integral therewith, one end of an arcuate scale arm 4 moving through a recess 5 in the arm 2.

The recess allows the surface of the scale to come flush with the surface of the arm 2 so that the clamping device 6 may be properly associated therewith.

This clamping device consists of a resilient plate 7 depressed transversely as illustrated at 8 so as to bear upon the scale and to give the proper resilient action to the clamping device.

One end of the plate is attached to the arm 2 by screws 9 while the other end of the plate has passed therethrough a thumb bolt 10. Thus it will be seen that by tightening the thumb bolt, pressure will be accomplished between the portion 8 and the scale 4, preventing movement of the limb 2.

In Figs. 3 and 4 the clamping device is identical with that just described with the exception that a circular depression 11 is provided so as to prevent weakening of the plate and to insure that the latter has the proper rigidity.

In Fig. 5 I have shown one form of pivot 12 that may be used with my invention and this is in the form of a sleeve having a tapering passage 13 the walls of which will frictionally engage the sharpened edge of a pencil for insuring the proper registration of the straight edge 14 of the limb 1 with the line $a$.

From the foregoing description taken in connection with the accompanying drawing it should be apparent that I provide a device which is admirably adapted for the purpose for which it is intended and which is simple, durable and efficient of construction and may be manufactured and sold at a comparatively low cost.

What I claim is:—

A measuring instrument comprising a stationary limb, a movable limb, a pencil receiving member pivoting the limbs together, an arcuate scale projecting from the stationary limb, concentrically of said member and slidably received in the recess of the movable limb thereof, a resilient plate having one end fixed to the movable limb and extending over the scale and having a projection bearing on the scale and a thumb screw mounted in the movable limb and engaging the remaining end of the plate.

In testimony whereof I affix my signature.

ORRANGE CIVITTS.

Copies of this patent may be obtained for five cents each, by addressing the "Commissioner of Patents, Washington, D. C."